Figure 1:
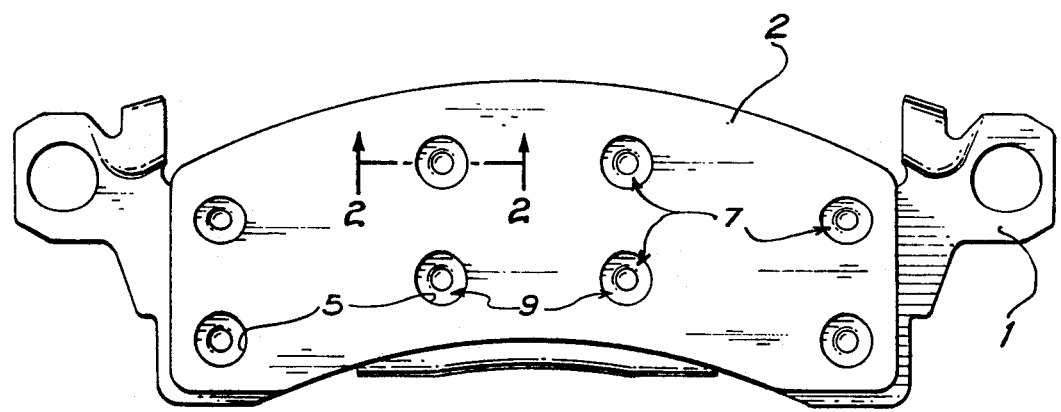

United States Patent [19]

Krupka

[11] 3,982,612

[45] Sept. 28, 1976

[54] BRAKE LINING DEVICE

[76] Inventor: Morris Krupka, 45 St. Jude St., Laval, Canada

[22] Filed: Aug. 19, 1975

[21] Appl. No.: 605,952

Related U.S. Application Data

[63] Continuation-in-part of Ser. No. 511,050, Oct. 1, 1974, abandoned.

[52] U.S. Cl............................. 188/73.1; 188/250 G; 219/150 V
[51] Int. Cl.²......................................... F16D 69/04
[58] Field of Search............... 188/73.1, 234, 250 G; 210/86, 98, 150 V

[56] References Cited
UNITED STATES PATENTS 1,876,811   9/1932   Whitworth...................... 188/250 G Primary Examiner—George E. A. Halvosa

[57] ABSTRACT

A device including a brake lining or the like friction lining, such as a brake shoe, which device is more economical and simpler to produce and avoids squealing due to loosening and separation of the lining relative to its support. The brake lining device of the present invention includes a rigid metal support, a lining of friction material provided with apertures therethrough; these apertures form a narrower inner portion and a wider outer portion, a cap, of metal, having a cup-shape and a flat annular flange, is engaged in each aperture with the flange in abutment against the shoulder portion defined between these outer and inner aperture portions, and having its closed end axially tensioned away from the flange and electrically welded against the metal support.

1 Claim, 2 Drawing Figures

U.S. Patent  Sept. 28, 1976  3,982,612

BRAKE LINING DEVICE

This application is a continuation-in-part application of U.S. Pat. application Ser. No. 511,050, filed Oct. 1st, 1974, now abandoned.

This invention relates to a brake lining device and, more particularly, to a device of the type including a friction braking plate or lining secured to a support, such as to constitute a brake shoe and lining assembly.

Brake linings are now currently riveted to their metal support. This is done by providing both the lining and the corresponding support with the same set of apertures for mutual registry of one set with the other. In practice, this has been found difficult to achieve and there is a fair percentage of rejects due to unsatisfactory registry of the apertures. Besides, sooner or later, the rivets may become loose and there results the familiar squealing of the corresponding wheels of the vehicles.

It is also known that squealing occurs when rivets are too tight, resulting in plastic flow of the friction lining out from the zone between the rivet head and the lining support and consequent bridging of the brake lining and its separation from the support in the region between the rivets.

It has been found that the brake linings and the friction linings of other similar devices, such as for clutches and automatic transmissions, may be more advantageously attached to their support.

It is a general object of the present invention to provide a brake lining device of improved construction and, in particular, which is relatively more economical and easier to produce and which specifically avoids squealing upon use thereof.

It is a more specific object of the present invention to provide a brake lining device, such as a brake shoe and lining assembly, wherin the lining is held by caps secured to the support by welding, whereby to avoid the need of holes through the support and the associated problems and also wherein the caps are elastically deformable and exert a continuous pressure of the proper value on the lining to continuously prevent squealing.

Figure 2:
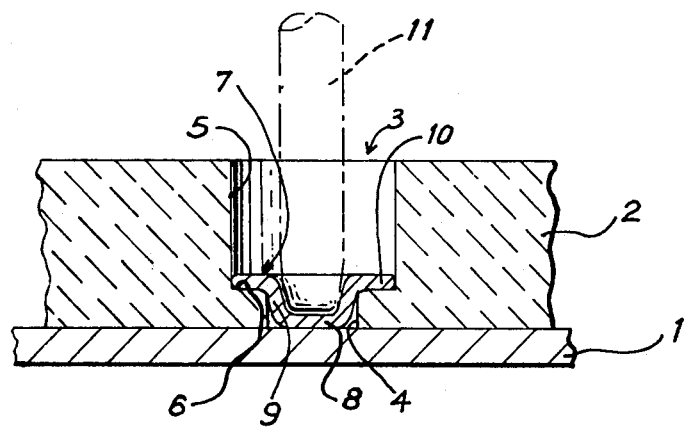

The above and other objects and advantages of the present invention will be better understood in the light of the following detailed description of a preferred embodiment thereof which is illustrated, by way of example, in the accompanying drawing, wherein:

FIG. 1 is a side view of a brake lining device, in the form of a brake shoe and lining assembly, according to the present invention; and FIG. 2 is a detailed cross-sectional view as seen along line 2—2 in FIG. 1.

The illustrated brake lining assembly or device is of the type adapted to be used in disc brakes and includes a carrying metal plate or support 1, of appropriate conventional shape, except that it is not provided with the usual set of apertures which are required for a riveted lining.

A brake lining plate 2, of suitable friction material, such as an asbestos composition, is secured flat against one face of the supporting plate 1. This brake lining plate 2 is provided with a predetermined set of apertures 3 therethrough. Each of these apertures has a narrower inner portion 4 and a wider outer portion 5 defining between them a shoulder 6.

The shoulder 6 faces away from the rigid support plate 1 when lining 2 is properly applied to the support. A metal cap, or insert 7, is engaged in each aperture 3 and is adapted to secure the lining plate 2 to the support 1. Each cap is made of metal, preferably stainless steel. It consists of a cup-shaped, or tubular member, including a closed inner end portion 8, a tubular side wall 9 flaring away from closed inner end portion 8 and an annular, outwardly extending flange 10 integrally depending from the free edge of the tubular side wall 9. The outer flange 10 is substantially flat providing a flat top face and a flat underface. The thicknesses of closed end portion 8, side wall 9 and flange 10 are substantially equal. The inner end portion 8 is substantially flat.

Each cap 7 is fitted within the aperture 3 such that the outer flange 10 seats on the shoulder 6 and the tubular side wall 9 extends in the narrower inner portion 4 of the aperture 3 with a close fit at the junction of said side wall 9 with flange 10. Flange 10 has a slightly smaller diameter than the wider portion 5 of aperture 3.

In the non-stressed condition of the cap 7, the distance between the outer face of the closed inner end portion 8 and the underface of the annular flange 10 is slightly less than the axial length of the narrower inner portion 4 of the aperture 3. Thus, pressure has to be exerted against the closed inner portion 8 towards the support to tension the cap and effect contact between the underface of the portion 8 and the contact face of the support 1. Sufficient pressure has to be exerted to elastically slightly bend the flange 10 specially at its junction with the tubular wall 9.

Since both the support 1 and the several caps 7 are made of metal, and the friction lining is conventionally of non-electrically conductive material, the caps can be electrically welded to support 1 only and not to lining plate 2. Each cap 7 is tensioned during welding by axially pressing the corresponding electrode 11 inserted within the tubular side wall 9 against the closed inner end 8. Pressure exerted by electrode 11 is sufficient to effect mechanical contact between inner end 8 and support plate 1. Obviously, support plate 1 is electrically connected to the electrode of opposite polarity for effecting the spot welding.

The thickness of the flange 10, the comparative axial length of the body 9 and of the inner portion 4 of the aperture 3 and the elasticity of the material making the insert 7, are all selected and corroborated so as to obtain sufficient pressure exerted by the lining 2 against support 1 to provide firm and close contact between these two parts in a permanent manner, since flange 10 is elastically deformable and will exert constant pressure. The corroboration is also such that the pressure exerted by cap flange 10 does not amount to such a value that it will cause outward plastic flow of the lining material in the region between the support 1 and the flange 10 all around the cap, which would cause separation of the lining 2 from support 1 in the regions between the various caps 7. Thus, squealing of the brake assembly is permanently eliminated.

What I claim is:

1. A brake lining device comprising a rigid metal support, a lining plate of friction material positioned against one face of said rigid metal support, said lining plate having a plurality of circular apertures spaced from one another, each aperture having a larger diameter portion and a smaller portion defining a flat shoulder at their junction, said shoulder facing away from said support and a cap of metal, positioned in each aperture, each cap including a generally tubular body having an integral flat bottom wall closing one end of said tubular body, and a flat annular flange integral with the free edge of said tubular body, and radially outwardly extending therefrom, said flange having a flat top face and a flat underface, said tubular body being circular in cross-section and flaring from said bottom wall toward said flange, the thicknesses of said flange, of the wall of said tubular body and of said bottom wall, being substantially equal the distance between the outer face of said bottom wall and the underface of said annular flange being slightly less than the axial length of said reduced diameter aperture portion in the non-stressed condition of said cap, said cap bottom wall being spot welded to said metal support in face-to-face contact, said flange engaging said shoulder with a predetermined pressure due to elastic elongation of said tubular body and also elastic flexing of said flange mainly in the region of its junction with the free edge of said body, the pressure exerted by said cap on said lining plate being sufficient to hold said lining plate in firm contact with said support in normal use of the device but insufficient to cause plastic flowing of the material of the lining plate out of the region between the annular flange and the metal support and consequent tendency of the contact face of the lining plate to come out of contact with the support in the zones between the apertures and caps.

* * * * *